Dec. 21, 1943. D. W. FENTRESS 2,337,037
WELDING MACHINE
Filed March 10, 1941 4 Sheets-Sheet 4
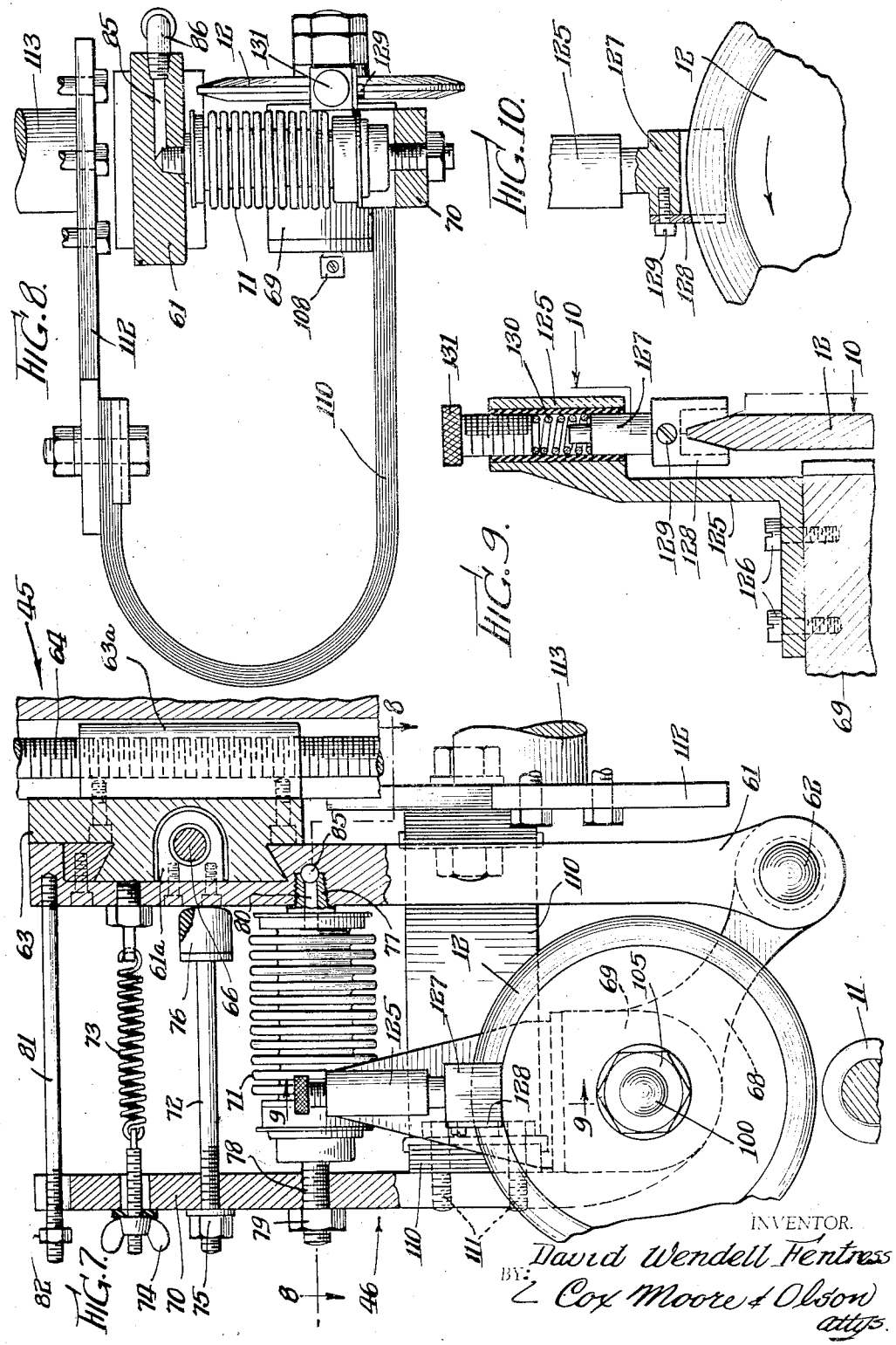
INVENTOR.
David Wendell Fentress
BY Cox Moore & Olson
attys.

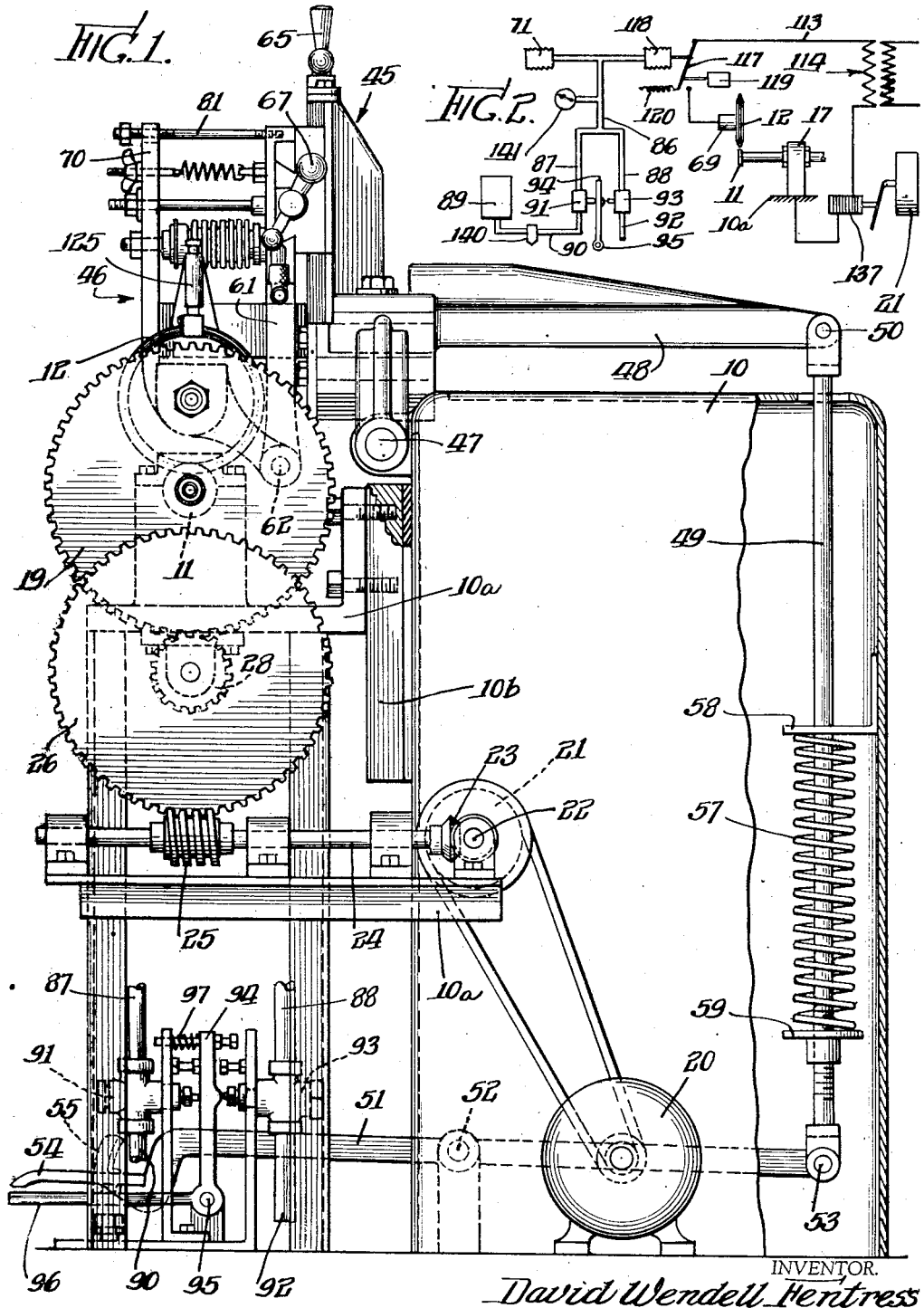

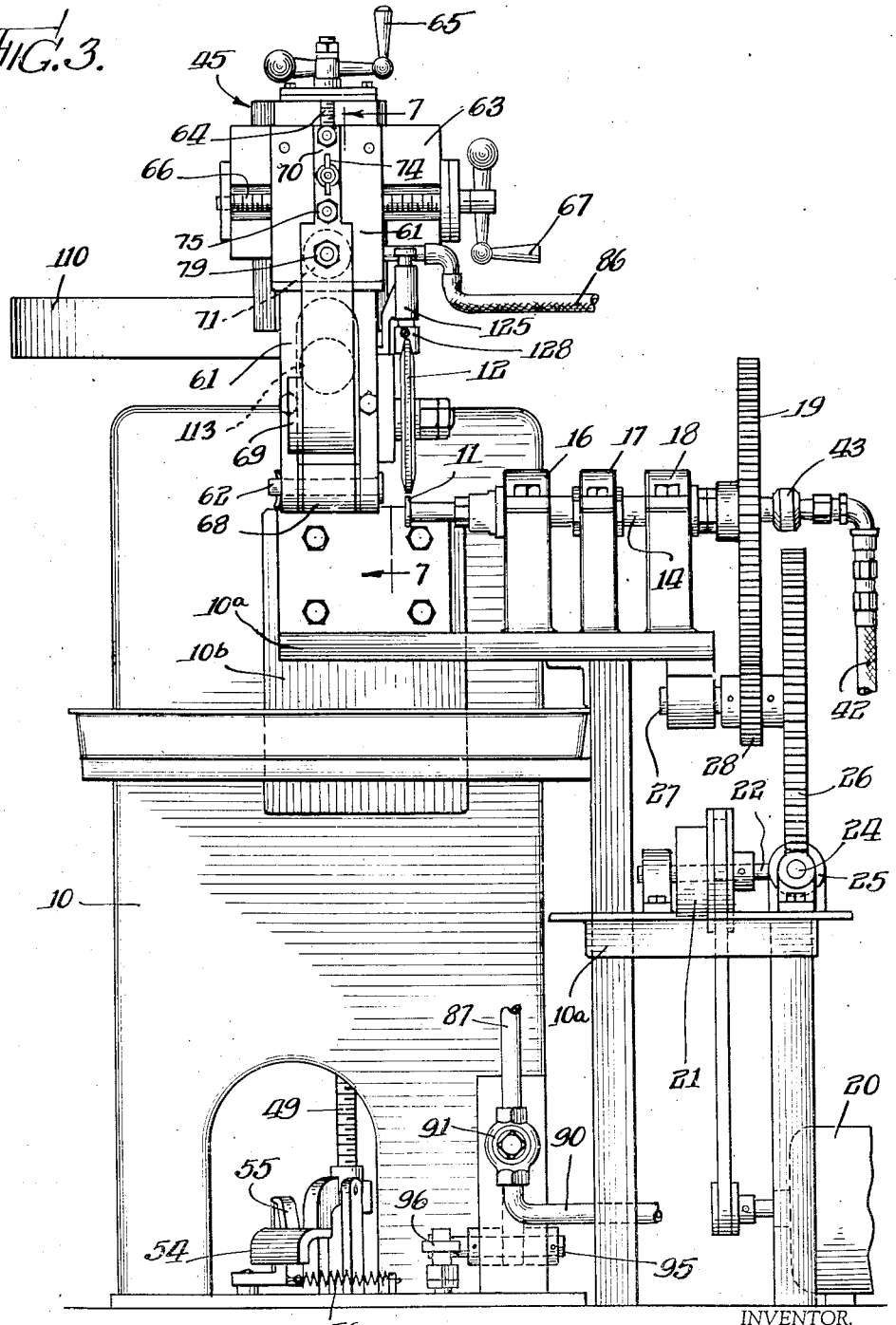

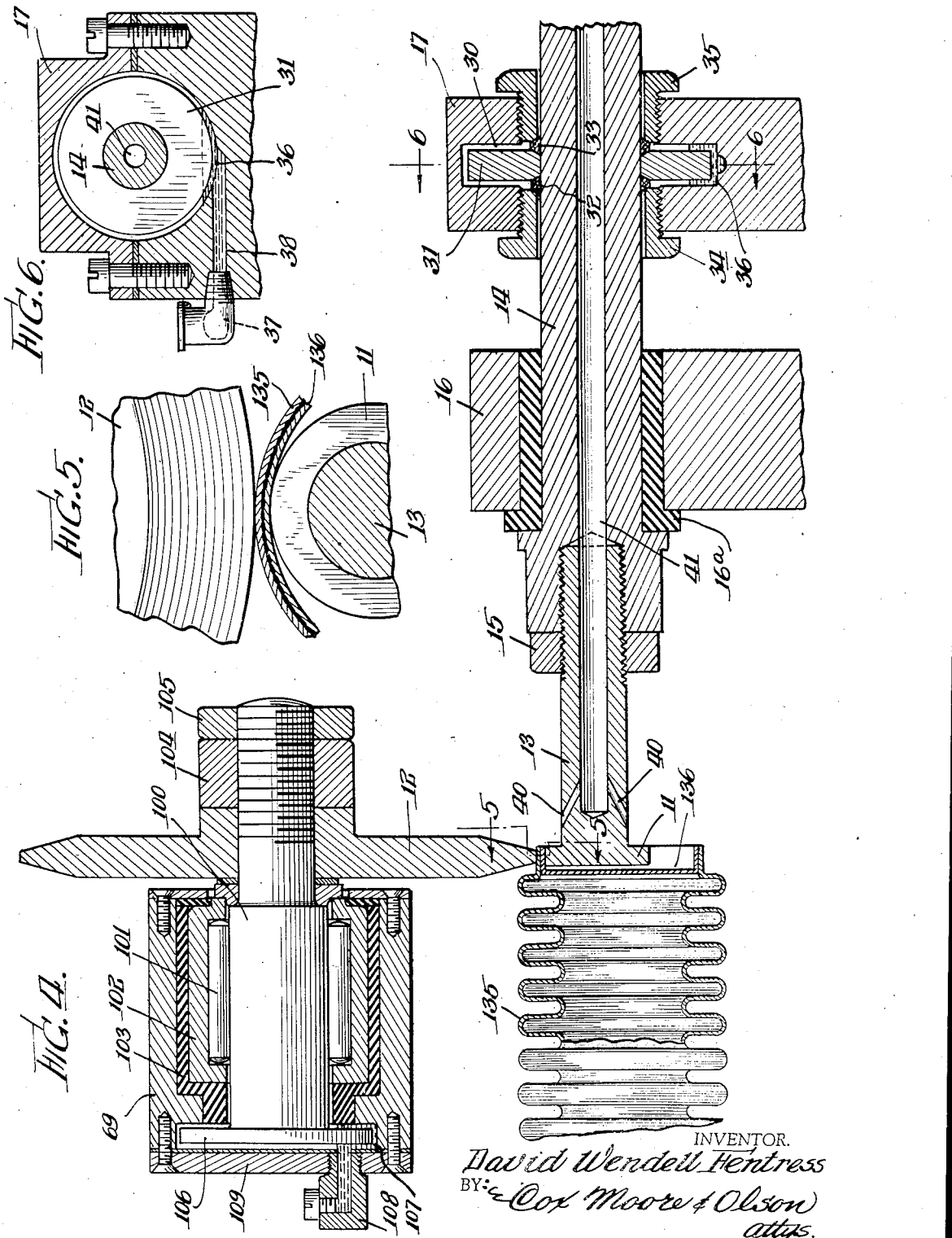

Patented Dec. 21, 1943

2,337,037

UNITED STATES PATENT OFFICE 2,337,037

WELDING MACHINE

David Wendell Fentress, Evanston, Ill., assignor to Chicago Metal Hose Corporation, Maywood, Ill., a corporation of Illinois Application March 10, 1941, Serial No. 382,493

20 Claims. (Cl. 219—4)

This invention relates to welding machines and methods.

It is an object of the invention to provide new and improved welding apparatus and methods, particularly adapted for the carrying out of precision welding operations.

It is a further object of the invention to provide improved welding apparatus and methods particularly adapted for the welding of tubing, tubing fittings, and like articles of manufacture.

A further and important object of the invention is to provide in welding apparatus or the like, improved means for bringing the welding electrode or electrodes into operative contact with the work at the welding station, and for maintaining such operative contact during the welding operation, which means quickly establishes and maintains a uniform and accurately controllable pressure contact between the welding electrode and work while at the same time permitting the electrode to conform readily to irregularities in the surface of the work.

Still further objects of the invention are to provide in welding apparatus or the like, improved means for conducting the welding current to and from the electrode or electrodes, improved means for preventing the overheating of electrodes at the welding station, and means for accurately timing the initiation and interruption of the welding current flow in relation to the positioning of the welding electrodes with respect to the work.

Various other objects, advantages and features of the invention will appear from the following specification when taken in connection with the accompanying drawings, wherein a preferred embodiment of the invention is set forth for purposes of illustration.

In the drawings, wherein like reference numerals refer to like parts throughout:

Fig. 1 is a general side elevation of a welding machine constructed in accordance with the principles of the invention and adapted for effecting the methods thereof;

Fig. 2 is a circuit diagram for the machine, illustrative in form;

Fig. 3 is a front view of the machine of Fig. 1;

Fig. 4 is a detail view, on an enlarged scale, of the welding electrodes and associated parts;

Fig. 5 is a partial detail view, on a further enlarged scale, of the welding electrodes and work at the welding station, and taken on the line 5—5 of Fig. 4;

Fig. 6 is a detail view, more particularly illustrating the manner of conducting the current from the lower welding electrode, and taken on the line 6—6 of Fig. 4;

Fig. 7 is a partial detail view more particularly illustrating the mounting for the upper welding electrode, and the operating mechanism therefor, on the line 7—7 of Fig. 3;

Fig. 8 is a sectional view of the structure of Fig. 7, taken on the line 8—8 thereof; and Figs. 9 and 10 are detail views of the dressing or shaping means for the upper electrode wheel, Fig. 9 being taken on the line 9—9 of Fig. 7, and Fig. 10 being taken on the line 10—10 of Fig. 9.

The machine or apparatus illustrated in the drawings is particularly adapted for effecting circular welding operations on tubing, tubing fittings, and like articles, and certain features of the invention are particularly applicable to work and apparatus of this character. It is to be understood, however, that other features of the invention are adapted for use with welding apparatus and machines generally.

Referring more particularly to the drawings, and first to Fig. 3 thereof, it will be seen that the machine or apparatus illustrated comprises a main frame 10, a lower welding arbor or roller electrode 11, and an upper roller electrode 12, the electrodes being cooperable to grip the work and effect the welding operation at the welding station. More specifically, as best shown in Fig. 4, the lower electrode 11 is in the form of a roller structure, the shank 13 of which is removably threaded into the shaft 14 rotatably carried by a machine subframe 10a, electrically insulated from the main machine frame 10. A lock nut 15 is employed for locking the electrode shank in position. It will be seen that by loosening the nut 15 and unthreading the electrode shank, electrodes of various sizes and type may be associated with the shaft 14 in accordance with the particular welding operations or work to be performed.

The electrode support shaft 14 is rotatably carried on the subframe 10a by a plurality of bearing block pedestals 16, 17 and 18, Fig. 3, supported upon the subframe, the shaft being driven by a gear 19 fixed to the end thereof. An electric motor drive is provided for the gear 19, which drive more specifically comprises an electric motor 20, a flexible belt drive, and a clutch 21. The clutch, when engaged, is adapted to rotate a shaft 22 which, by means of bevel gears 23, drives a shaft 24 on which a worm 25 is fixed. Worm 25 drives a gear 26 fixed to a shaft 27, which shaft also carries a gear 28 in driving engagement with the gear 19. By means of the described driving connections, it will be seen that the motor 20 is adapted to drive the shaft 14 and its associated electrode, at relatively reduced speed, the particular driving speed being predetermined by the size of the gears 28 and 19. These gears, which are made readily removable and replaceable by gears having other preselected gear ratios, thus provide a change speed gearing arrangement for predetermining the speed at which the welding arbor 11 will be driven, in accordance with the frequency of welding impulses and character of the work.

The means for conducting the electric current to the lower welding arbor will be best understood by reference to Figs. 4 and 6. In accordance with the structure shown, the support pedestal 17, which is grounded to the machine subframe, is provided with a central chamber or cavity 30 in which a collar 31 secured to the shaft 14 is loosely rotatable. More specifically, the collar 31, which is fixed to and rotates with the shaft 14, is held in proper position within the chamber 30, and out of inadvertent contact against the walls thereof, by reason of its bearing engagement against a pair of bearing rings 32 and 33, which rings are in turn positioned by adjustable collars 34 and 35 having screw threaded engagement with the support pedestal. The bearing rings 32 and 33 are preferably of felt or the like. By adjustment of the collars 34 and 35, the rotatable collar 31 is maintained in proper position within the pedestal chamber, as shown. The chamber 30 is adapted to be partially filled with a bath of mercury or the like, as indicated at 36, the mercury being introduced and replenished from time to time as may be required by means of a fill cap 37 and associated channel 38 extending through the pedestal. Sufficient mercury is introduced into the chamber so that the lower portion of the rotatable collar 31 is constantly immersed within the liquid mercury bath. By this means it will be seen that the electric current may be conducted from the welding electrode 11 to the subframe 10a of the machine without being passed through rotatable bearings or the like. More particularly, the current passes from the electrode through shaft 14 and collar 31, and thence by means of the mercury bath into the support pedestal 17 and the subframe 10a. The necessity for the passage of the current through relatively slidable metal bearing surfaces is thus avoided, precluding current arcing and resultant scoring or pitting of such bearing surfaces. To preclude the passage of current from the shaft 14 to the subframe, except through the mercury bath and pedestal 17, insulation bearing sleeves of suitable insulating material, such as indicated at 16a, Fig. 4, are provided for insulating the shaft from pedestals 16 and 18. Also, the gear 19 is preferably insulated from the shaft by a similar support sleeve.

The subframe 10a is supported by and electrically connected to a support plate 10b, Figs. 1 and 3, supported on but insulated from the main machine frame 10, the support plate being suitably connected to one branch of the welding transformer. The electric circuit for the electrodes is diagrammatically shown in Fig. 2.

It is to be understood that the drive for shaft 14, including the gearing 19—28 and the motor 20 may all be supported by the machine subframe 10a.

Means is provided for cooling the electrodes and the work at the welding station which means comprises a plurality of spray nozzles 40, Fig. 4, in the lower electrode communicating with a channel 41 centrally disposed within the electrode shank and the shaft 14. Coolant fluid is supplied to channel 41 by means of a flexible hose or the like 42, Fig. 3, leading from any suitable source of supply. A rotatable coolant connection, as indicated at 43, is provided so that the hose 42 may remain stationary as the shaft 14 rotates.

The support means for positioning and controlling the shifting of the upper roller electrode 12 is best shown in Figs. 1, 3 and 7, and comprises a main head or frame structure 45 shiftable to bring the electrode roller into general proximity to the work, and an auxiliary head or frame structure 46 pivotally mounted on the head 45 and adapted to bring the electrode into final work contacting position. The auxiliary head frame is electrically insulated from the main head frame and the rest of the machine, and is connected to the other branch of the welding transformer, as will be later described. More specifically, the head 45 is pivoted to the machine frame 10 by means of a pivot connection 47, and is provided with a rearwardly extending operating lever or frame 48 formed as a part of and rigidly connected to the main head frame. It will be seen that as the operating lever 48 is raised or lowered, the main head frame 45 will be pivoted around the axis 47, thereby bringing the upper electrode roller toward or away from the work.

The means for operating the lever 48 comprises a vertically extending shaft or link 49 pivotally connected to the lever 48, as indicated at 50, and a foot lever 51 pivotally mounted on the frame of the machine as indicated at 52 and pivotally connected at its rear end to the lower end of the link 49 by means of a pivot connection as indicated at 53. The forward end of the foot lever is formed with a treadle portion 54 adapted to be depressed by the machine operator with his foot whereby to pivot the foot lever 51 counterclockwise resulting in the corresponding counterclockwise shifting of the head frame 45 to bring the electrode roller toward the work. If desired, a latch device, as indicated at 55, Figs. 1 and 3, may be provided for holding the foot treadle depressed, the latch device being spring-urged into latching position by means of a spring 56, and releasable by foot engagement to permit the return or upward shifting of the foot treadle as may be desired at the completion of the welding operation. A main counterbalancing compression spring 57 is provided in association with the link 49 for normally urging the foot lever 51 clockwise and the foot treadle into raised position. Spring 57 bears, at its upper end, against a frame abutment 58 and is connected at its lower end to the link 49 by means of a collar 59 threadedly adjustable longitudinally of the link to permit adjustment of the spring pressure.

The main head frame is provided with a downwardly extending bifurcated support member 61 upon which the auxiliary head frame 46 is pivotally mounted as indicated at 62. The support member 61 is carried by the main head frame by compound adjustment means providing for its vertical and lateral adjustment. More specifically, the main head frame carries a vertical slide assembly 63 vertically adjustable with respect to the head frame by means of an adjustment screw 64 and an associated handle 65, which adjustment screw has screw threaded engagement with a nut portion 63a forming a part of the vertical slide assembly. The support member 61 is carried by the assembly 63 for lateral adjustment thereon, and to this end the slide assembly 63 is provided with an adjustment screw 66 operable by a handle 67, which screw has threaded engagement with a nut member 61a forming a part of the support member 61. It will be seen that by manipulation of handle 65, the slide 63 and the support member 61 carried thereby may be vertically adjusted, whereas by manipulation of handle 67, the support member 61 may be laterally moved with respect to the slide assembly 63 into the desired and proper position.

In accordance with the principles of the invention, the auxiliary frame or head 46, which directly carries the upper roller electrode 12, is of relatively light construction and hence of low inertia characteristics so that it may be readily as well as quickly pivoted on its support pivot 62. In general it comprises an inclined bracket 68 upon which the support pedestal 69 for the electrode roller is mounted, and an associated vertically disposed front plate 70. The pivotal movements of the auxiliary head frame about the pivot 62 are controlled by an expansion bellows or power unit 71 adapted to be actuated by air pressure, an abutment stop 72 and a control spring 73, as best shown in Fig. 7. The spring 73, which is a tension spring, is anchored at one end to the support member 61 and at its other end to the plate 70 forming a part of the auxiliary head frame, the connection between the spring and the plate 70 being adjustable under the control of a wing nut 74 whereby the tension of the spring may be adjusted. The abutment stop device 72 is adjustably carried by the plate 70 by reason of its threaded engagement therewith, and is adapted to be held in adjusted position by means of a lock nut or the like 75. The stop device is provided with an abutment end 76 adapted to engage the support member 61 and limit the pivotal movement of the auxiliary head frame in a clockwise direction. The expansion bellows or power device 71 is carried at one end upon the support member 61 by means of a threaded nipple or the like 77 and at its other end upon the plate 70 by means of a threaded stud 78 and associated lock nut 79. The nipple 77 is provided with an air passage 80 in communication with the interior of the bellows and through which air may be introduced to and ejected from the bellows construction.

It will be seen that in operation, as air or other power fluid is introduced into the bellows, expanding the same, the auxiliary head frame will be pivoted counterclockwise as seen in Fig. 7 against the action of the spring 73, whereas when the operating fluid is permitted to escape from the bellows, the spring effects the clockwise return of the auxiliary head frame until stopped by the abutment device 72. The welding electrode 12 is thus brought into engagement with the work by the introuction of the power fluid into the bellows power device, and automatically disengaged from the work as the fluid is permitted to escape. Normally the engagement of the electrode with the work limits the counterclockwise movement of the auxiliary head frame, but to prevent the undue motion of the head frame in a counterclockwise direction, for example if the bellows is expanded when the lower electrode roller has been removed, a motion limiting means 81 is provided secured to the support 61 and having an adjustable stop nut 82 on its end which is adapted to abut and limit the counterclockwise movement of the head frame beyond a predetermined distance.

The means for controlling the delivery of the air or other power fluid to and from the bellows or power device 71 is best illustrated in Figs. 1, 3, 7 and 8, and also diagrammatically in Fig. 2. It will be seen that the channel 80 of nipple 77 is in fluid communication with a channel 85 formed in the support member 61, which latter channel is in turn in fluid communication with a conduit 86 having branch connection with supply and exhaust pipe lines 87 and 88. Supply pipe line 87 communicates with a source of fluid pressure supply 89 by means of a pipe 90 and a control valve 91, whereas exhaust pipe 88 communicates with a pipe line 92 exhausting to atmosphere, through an exhaust control valve 93.

Valves 91 and 93 are controlled from a common bell crank valve operating lever 94, Fig. 1, pivoted to the frame of the machine as indicated at 95 and provided with a forwardly extending foot treadle portion 96. A compression spring 97 normally urges the bell crank lever 94 clockwise, holding the exhaust valve 93 open and the pressure control valve 91 closed. To effect a welding operation the operator depresses the treadle 96 which effects the movement of the bell crank lever in a counterclockwise direction, closing the exhaust valve 93 and opening the inlet pressure valve 91 whereby to introduce fluid pressure into the bellows 71, bringing the electrode 12 into engagement with the work. As long as the foot treadle 96 is held depressed, the electrode is urged into engagement with the work, and upon release of the foot treadle, the electrode is automatically lifted by the return spring 73.

As previously indicated, the auxiliary head frame is electrically insulated from the rest of the machine, and to this end suitable insulation means are associated with the pivot 62, the bellows 71, and the control devices 72, 73 and 81 so as to prevent the transmission of current from the auxiliary head frame to the main head frame 45.

The manner of mounting the upper electrode roller 12 upon its support pedestal 69 is shown in Fig. 4. As shown, the electrode support shaft or axle 100 is journaled by roller bearings 101 operable within a non-ferrous bearing race member 102 mounted by means of an insulation sleeve 103 within the support pedestal 69. Lock nuts 104 and 105 threadedly secured to the end of the shaft 100, provide means for permitting the substitution and replacement of the electrode roller.

To facilitate the transmission of the welding current from the auxiliary head frame and the pedestal 69 to the electrode roller, the end of shaft 100 is provided with a flange portion 106, the lower portion of which is adapted to be continuously immersed within a bath of liquid mercury as indicated at 107, similar in purpose and function to the liquid mercury bath 36 previously described in connection with the lower electrode roller. The insulation sleeve 103 prevents the transmission of current to the electrode roller except through the mercury bath. The mercury bath may be replenished from time to time, as may be required, by means of a fill plug 108 screw threaded into the cover plate 109 associated with the support pedestal 69. As best shown in Fig. 8, the electric current is supplied to the support pedestal 69 by means of a series of superposed copper strips 110, the strips being anchored at one end to the auxiliary frame by means of bolts 111, Fig. 7, and at the other end to a supply plate 112 associated with a line 113 leading from the secondary of the welding transformer 114, Fig. 2. The copper strips 110 have sufficient flexibility to permit the ready movement or shifting of the auxiliary head frame 46 as previously described.

In accordance with the principles of the invention, the supply of current to the welding electrodes is correlated with the movement of the electrode roller 12 into engagement with the work, so as to insure that the work will always be engaged before the welding current is applied, and that the welding current will be cut off before the work is disengaged. To this end, referring further to Fig. 2, a switch, as indicated at 117, is arranged in the supply line 113 leading from the welding transformer, which switch is controlled by a bellows device 118 connected to the pressure fluid supply line 86. A dash pot device 119 is also connected to the switch for delaying its movement in switch closing direction, and a tension spring 120 normally tends to move the switch to open position. It will be seen that as fluid pressure is introduced into the pipe line 86 to operate bellows 71 and move electrode roller 12 into work engaging position, fluid pressure is simultaneously introduced into the bellows 118 to close the switch 117. However, the dash pot 119 sufficiently delays the closing of the switch so as to insure that the work will be engaged before the welding current is applied. When the fluid pressure is exhausted from the pipe line 86 at the completion of the welding operation, the switch will be opened by its spring 120, and in this instance the switch movement is sufficiently quick acting so as to insure the breaking of the current supply before the electrode roller is disengaged from the work. Arcing between the work and electrodes is thereby precluded.

In Figs. 9 and 10 an arrangement is illustrated for maintaining the electrode roller 12 of proper profile or cross section. To this end a scraper support 125 is mounted on the pedestal 69 by means such as screws 126. The support 125 is provided with a cylindrical bore at its upper portion within which a piston member 127 is loosely fitted. This piston member carries a profiling scraper plate 128 which is mounted thereon by means of a screw or the like 129. A compression spring 130 bears downwardly on the piston member, the tension of the spring being determined by an adjustment screw 131. By means of this structure the scraper plate is maintained in constant resilient engagement at predetermined pressure against the periphery of the roller electrode 12, thereby maintaining the electrode periphery of proper cross section and contour. The substitution of scraper plates of a desired size and character may be effected by removal of the screw 129.

Referring to the operation of the apparatus, the particular work being welded, as illustrated in Figs. 4 and 5, comprises a piece of corrugated tubing or bellows 135, the cylindrical end portion of which is to be welded to a cap member 136. To effect the welding operation, the operator, after starting motor 20 and arranging the work between the welding electrodes, depresses foot treadle 84 whereby to move the main head frame 45 and bring the welding electrode 12 into general proximity with the work. The foot treadle becomes automatically latched in position. The operator then depresses the foot treadle 96 applying pressure fluid to the bellows devices 71 and 75 118, thereby automatically moving the auxiliary head frame 46 relative to the main head frame to bring the electrode 12 into work contact, and thereafter closing the welding current circuit. As shown in Fig. 2, an electromagnet 137 is arranged in the welding circuit adapted to control the driving clutch 21, so that as the circuit is energized the clutch is simultaneously engaged to rotate shaft 14 and drive the work and electrodes.

Due to the low inertia characteristics of the auxiliary head frame, which is of relatively light construction, not only is the electrode roller 12 quickly and readily moved into and from work contacting positions, but during the welding operation as irregularities on the work surface may be encountered, the auxiliary head frame may readily shift to accommodate such irregularities. The bellows operating device 71, while providing a reliable operating mechanism for moving the auxiliary head frame, does not impart any substantial mass or inertia thereto so as to interfere with the action described.

The fluid pressure operated power device 71 also insures a controlled and maintained pressure engagement between the work and the electrodes, at any predetermined pressure which may be required. That is, by controlling the air pressure through any suitable pressure regulating means such as an adjustable pressure reducing valve as diagrammatically indicated at 140, the desired predetermined operating pressure of the bellows device 71 may be accurately controlled. It will be noted that this same desired or preset pressure engagement with the work will be constantly maintained even though the auxiliary head frame shifts somewhat due to work irregularities. In other words, the desired work engaging pressure is maintained constant notwithstanding variations in the positioning of the electrode roller 12, and to this end it will be noted that the point of engagement between the electrode roller and the work is substantially horizontally disposed with respect to the auxiliary frame pivot point 62. Additionally, it will be noted that the supply pipe 86 is associated with a pressure gauge as indicated at 141 so that the operating pressure for the bellows 71 may be observed. By this means pressure conditions within the fluid supply line may be accurately controlled and duplicated as may be required. That is, work pieces requiring identical work engagement pressures may be subjected to such identical pressures even though the welding operations are done at widely separated times.

At the completion of the welding operation, as the foot treadle 96 is released, the welding current circuit is automatically broken before the work is disengaged by shifting of the auxiliary head frame, precluding sparking at the electrodes. Sparking or pitting of the bearing contact surfaces is precluded by the mercury reservoir contact means 36 and 107. The maintenance of the welding electrodes at the proper temperature is insured by the cooling ducts 40, and the scraper device 128 insures the maintenance of the electrode roller 12 in the proper shape and contour.

It is obvious that various changes may be made in the specific embodiment of the invention as set forth for purposes of illustration without departing from the spirit of the invention. Accordingly, the invention is not to be limited to the specific embodiment shown and described, but only as indicated in the following claims.

The invention is hereby claimed as follows:

1. Welding apparatus comprising an electrode member engageable with a work piece to be welded, means for passing welding current through the electrode while in engagement with the work piece whereby to effect the welding operation, means including a fluid pressure operated expansible bellows members for maintaining the electrode and work relatively in contact during the welding operation, a spring opposing the action of the bellows, and a stop member for limiting the movement of the spring.

2. Welding apparatus comprising a base, an electrode member engageable with a work piece to be welded, means for passing welding current through the electrode while in engagement with the work piece whereby to effect the welding operation, and support means for bringing the electrode and work relatively into contact and for maintaining such contact during the welding operation, said support means comprising a main head frame shiftably mounted on the base, an auxiliary head frame mounted on the main head frame and shiftable with respect thereto, and operating mechanism for shifting the auxiliary head frame relative to the main head frame to bring the electrode and work into operative contact.

3. Welding apparatus comprising a base, an electrode member engageable with a work piece to be welded, means for passing welding current through the electrode while in engagement with the work piece whereby to effect the welding operation, and support means for bringing the electrode and work relatively into contact and for maintaining such contact during the welding operation, said support means comprising a main head frame shiftably mounted on the base, and an auxiliary head frame of relatively light weight pivotally mounted on the main head frame and shiftable to bring the electrode member and work piece relatively into contact.

4. Welding apparatus comprising a base, an electrode member engageable with a work piece to be welded, means for passing welding current through the electrode while in engagement with the work piece whereby to effect the welding operation, and support means for bringing the electrode and work relatively into contact and for maintaining such contact during the welding operation, said support means comprising a main head frame shiftably mounted on the base to bring the electrode and work relatively toward each other, an auxiliary head frame carried by the main head frame and shiftable with respect thereto to bring the electrode and work relatively into contact, and fluid pressure operated means for shifting the auxiliary head frame.

5. Welding apparatus comprising a base, an electrode member engageable with a work piece to be welded, means for passing welding current through the electrode while in engagement with the work piece whereby to effect the welding operation, and support means for moving the electrode and work relatively into contact and for maintaining such contact during the welding operation, said support means comprising a main head frame shiftably mounted on the base to bring the electrode and work relatively toward each other, a light weight auxiliary head frame pivotally carried by the main head frame and shiftable with respect thereto to bring the electrode and work relatively into contact, and fluid pressure operated means for shifting the auxiliary head frame.

6. Welding apparatus comprising a base, an electrode member engageable with a work piece to be welded, means for passing welding current through the electrode while in engagement with the work piece whereby to effect the welding operation, and support means for bringing the electrode and work relatively into contact and for maintaining such contact during the welding operation, said support means comprising a main head frame, means for shifting the main head frame relative to the base to bring the electrode and work relatively toward each other, a support member carried by the main head frame, means for adjustably positioning the support member on the main head frame, an auxiliary head frame shiftably carried by the support member, and means for shifting the auxiliary head frame to bring the electrode and work relatively into contacting relation.

7. Welding apparatus comprising an electrode member engageable with a work piece to be welded, means for energizing the electrode while in engagement with the work piece whereby to effect the welding operation, means for holding the electrode and work relatively in contact during the welding operation, means for shifting the electrode and work relative to each other while in contact and during the welding operation, and control means interconnecting the energizing means, the shifting means and the holding means whereby the energizing means is operative only while the shifting means and the holding means are operative, said control means including means for effecting the operation of the energizing means and the holding means in predetermined timed sequence.

8. Welding apparatus comprising a main frame structure, an auxiliary frame of relatively light weight pivotally mounted on the main frame structure for pivotal shifting thereon through a predetermined arc of travel, an electrode member carried by the auxiliary frame engageable with a work piece to be welded, means for moving the electrode and work relatively into contact, said means comprising a fluid operated actuator having one portion thereof connected to the main frame and another portion thereof connected to the auxiliary frame whereby upon operation of said actuator the auxiliary frame is pivotally shifted to bring the electrode and work relatively into contact, means comprising a second fluid operated actuator for energizing the electrode while in engagement with the work piece whereby to effect the welding operation, and a common fluid supply means for operating said fluid actuators in predetermined timed relation.

9. Welding apparatus comprising a base, an electrode member engageable with a work piece to be welded, means for energizing the electrode while in engagement with the work piece whereby to effect the welding operation, and support means for moving the electrode and work relatively into contact and for maintaining them in contact during the welding operation, said support means comprising a main head frame shiftably mounted on the base to bring the electrode and work relatively toward each other, and an auxiliary head frame carried by the main head frame and shiftable thereon to bring the electrode and work relatively into contact, means for shifting the auxiliary head frame, and means interconnecting said shifting means and the electrode energizing means for predetermined timed operation.

10. Welding apparatus comprising a base, an electrode member engageable with a work piece to be welded, means for energizing the electrode while in engagement with the work piece whereby to effect the welding operation, and support means for moving the electrode and work relatively into contact and for maintaining them in contact during the welding operation, said support means comprising a main head frame shiftably mounted on the base to bring the electrode and work relatively toward each other, and an auxiliary head frame carried by the main head frame and shiftable thereon to bring the electrode and work relatively into contact, means for shifting the auxiliary head frame, and fluid pressure operated means for operating the electrode energizing means and the auxiliary head frame shifting means.

11. Welding apparatus comprising a work support for supporting a work piece, a roller electrode, a pivotally mounted main head frame for supporting the roller electrode, means for moving the main head frame to bring the electrode toward the work piece, an auxiliary head frame pivotally mounted on the main head frame upon which the roller electrode is directly mounted, and means including an air operated bellows for shifting the auxiliary head frame relative to the main head frame to bring the roller electrode into contact with the work.

12. Welding apparatus comprising a work support for supporting a work piece, a roller electrode, a pivotally mounted main head frame for supporting the roller electrode, means for moving the main head frame to bring the electrode toward the work piece, an auxiliary head frame pivotally mounted on the main head frame upon which the roller electrode is directly mounted, means including an air operated bellows for shifting the auxiliary head frame relative to the main head frame to bring the roller electrode into contact with the work, fluid pressure operated means for energizing the electrode, and means interconnecting the electrode energizing means and the auxiliary head frame shifting means for predetermined sequential operation.

13. Welding apparatus as defined in claim 9, wherein said auxiliary head frame is pivotally carried by the main head frame.

14. Welding apparatus comprising a base, a work support for supporting a work piece, a roller electrode, a shiftably mounted main head frame carried by the base for supporting the roller electrode, means for moving the main head frame to bring the electrode toward the work piece, an auxiliary head frame shiftably mounted on the main head frame upon which the roller electrode is directly mounted, and means including an air operated bellows for shifting the auxiliary head frame relative to the main head frame to bring the roller electrode into contact with the work, said control means including means for effecting the operation of the energizing means and the holding means in predetermined timed sequence.

15. Welding apparatus comprising an electrode member engageable with a work piece to be welded, means for passing welding current through the electrode while in engagement with the work piece whereby to effect the welding operation, means including a fluid pressure operated expansible bellows member for moving the electrode and work relatively into an operative contacting position, adjustable stop means for limiting the movement of the bellows member immediately beyond said position in the event a work piece is not present as the bellows member is operated, and means comprising a spring opposing the action of the bellows and operative upon the release of fluid pressure from the bellows to effect the relative separation of the electrode and work.

16. Welding apparatus comprising a pair of roller electrodes cooperative to grip a work piece to be welded therebetween, means for energizing the electrodes while in engagement with the work piece to effect the welding operation, means for holding the electrodes in contact with the work during the welding operation, means for rotating the electrodes, and means interconnecting the energizing means, the holding means and the rotating means whereby the energizing means is operative only while the rotating means and the holding means are operative.

17. Welding apparatus comprising a main frame structure, a support adjustably mounted on the main frame, an auxiliary frame of relatively light weight pivotally mounted on the support for pivotal shifting thereon through a predetermined arc of travel, an electrode member carried by the auxiliary frame engageable with a work piece to be welded, means for moving the electrode and work relatively into contact, said means comprising a fluid operated actuator having one portion thereof connected to the support and another portion thereof connected to the auxiliary frame whereby upon operation of said actuator the auxiliary frame is pivotally shifted to bring the electrode and work relatively into contact, and means comprising a spring opposing the action of the fluid operated actuator and operative upon the release of fluid pressure therefrom to effect the shifting of the auxiliary frame to separate the electrode and the work.

18. Welding apparatus comprising a main frame structure, an auxiliary frame of relatively light weight pivotally mounted on the main frame structure for pivotal shifting thereon through a predetermined arc of travel, a roller electrode carried by the auxiliary frame engageable with a work piece to be welded, means for moving the electrode and work relatively into contact, said means comprising an air-operated bellows structure having one portion thereof connected to the main frame and another portion thereof connected to the auxiliary frame whereby upon operation of said bellows structure the auxiliary frame is pivotally shifted to bring the electrode and work relatively into contact, and means comprising a spring opposing the action of the bellows and operative upon the release of air pressure therefrom to shift the auxiliary frame to effect a separation of the electrode and the work.

19. Welding apparatus comprising a main frame structure, an auxiliary frame of relatively light weight pivotally mounted on the main frame structure for pivotal shifting thereon through a predetermined arc of travel, a shiftable roller electrode carried by the auxiliary frame engageable with a work piece to be welded on one side thereof, a stationary roller electrode engageable with the work piece on the other side thereof, means for moving the auxiliary frame to bring the electrodes into gripping relation with the work piece, said means comprising an actuator having one portion thereof connected to the main frame and another portion thereof connected to the auxiliary frame, means for controlling the operation of said actuator, and screw threaded means for effecting micrometer adjustments of the auxiliary frame in a direction parallel with the axis of the fixed electrode whereby to effect the adjustment of the shiftable electrode with respect thereto.

20. Welding apparatus comprising a main frame structure, an auxiliary frame of relatively light weight pivotally mounted on the main frame structure for pivotal shifting thereon through a predetermined arc of travel, a shiftable roller electrode carried by the auxiliary frame engageable with a work piece to be welded on one side thereof, a stationary roller electrode engageable with the work piece on the other side thereof, means for moving the auxiliary frame to bring the electrodes into gripping relation with the work piece, said means comprising an actuator having one portion thereof connected to the main frame and another portion thereof connected to the auxiliary frame, means for controlling the operation of said actuator, and screw threaded means for effecting micrometer adjustments of the auxiliary frame in a direction perpendicular to the axis of the fixed electrode whereby to effect the adjustment of the shiftable electrode with respect thereto.

DAVID WENDELL FENTRESS.

CERTIFICATE OF CORRECTION.

Patent No. 2,337,037.                                          December 21, 1943.

DAVID WENDELL FENTRESS.

It is hereby certified that error appears in the printed specification of the above numbered patent requiring correction as follows: Page 5, first column, line 6, for "members" read --member--; page 6, first column, line 58, after "work" strike out the comma and insert instead a period; lines 59 to 61 inclusive, strike out the words and period "said control means including means for effecting the operation of the energizing means and the holding means in predetermined timed sequence."; and second column, line 11, before "means" insert --control--; line 15, after "operative" and before the period insert the comma and words --, said control means including means for effecting the operation of the energizing means and the holding means in predetermined timed sequence--; and that the said Letters Patent should be read with this correction therein that the same may conform to the record of the case in the Patent Office.

Signed and sealed this 11th day of April, A. D. 1944.

Leslie Frazer (Seal)                                            Acting Commissioner of Patents.